United States Patent [19]

Melcher

[11] Patent Number: 5,076,514
[45] Date of Patent: Dec. 31, 1991

[54] APPARATUS FOR LATCHING TWO PARTS TOGETHER

[75] Inventor: Joseph C. Melcher, Auburn, Wash.

[73] Assignee: The Boeing Company, Seattle, Wash.

[21] Appl. No.: 562,170

[22] Filed: Aug. 3, 1990

[51] Int. Cl.$^5$ ............... B64D 29/06; E05C 21/00
[52] U.S. Cl. ..................... 244/129.4; 292/341.18; 292/113
[58] Field of Search ............ 244/129.4, 53 R, 129.1, 244/110 B; 292/341.18, 113, 241, 28, 19, 190, 109, 137, 273, DIG. 31; 294/82.32, 116

[56] References Cited

U.S. PATENT DOCUMENTS

| | | | |
|---|---|---|---|
| 1,525,303 | 2/1925 | Lanphere | 292/190 X |
| 2,894,777 | 7/1959 | Hogan | 244/129.4 |
| 4,320,912 | 3/1982 | Grace et al. | 292/341.18 |
| 4,365,775 | 12/1982 | Glancy | 244/53 R |
| 4,421,349 | 12/1983 | Greiert, Jr. | 292/19 |
| 4,538,843 | 9/1985 | Harris | 292/113 |
| 4,549,708 | 10/1985 | Norris | 244/129.4 |
| 4,557,441 | 12/1985 | Aspinall | 244/129.4 |
| 4,691,952 | 9/1987 | Harmon | 292/341.18 |
| 4,798,408 | 1/1989 | Harmon et al. | 292/341.18 |

Primary Examiner—Joseph F. Peters, Jr.
Assistant Examiner—Carla Mattix
Attorney, Agent, or Firm—R. H. Sproule; B. A. Donahue

[57] ABSTRACT

Apparatus for latching a thrust reverser cowl to an engine includes a hooking mechanism which is attached to the thrust reverser cowl and a receiver mechanism which is attached to the engine fan case. When the thrust reverser cowl is inserted about the engine, a hook portion of the hooking mechanism engages a U-ring portion of the receiver mechanism to hold the clamshells of the thrust reverser cowl in place. The receiver mechanism includes a slotted base which supports a slidable bar therein. The slidable bar has the U-ring attached to one end and a threaded shaft attached to its opposite end. The position of the slidable bar along the base is maintained by the location of the nut on the shaft which engages a keeper mounted to the end of the base.

8 Claims, 3 Drawing Sheets

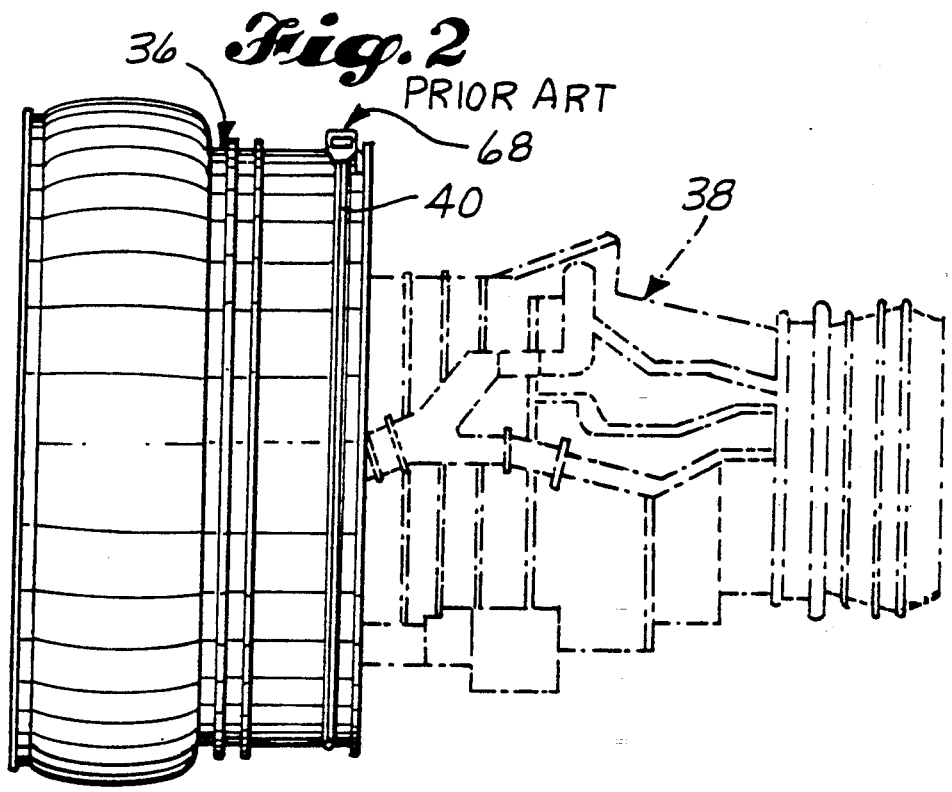
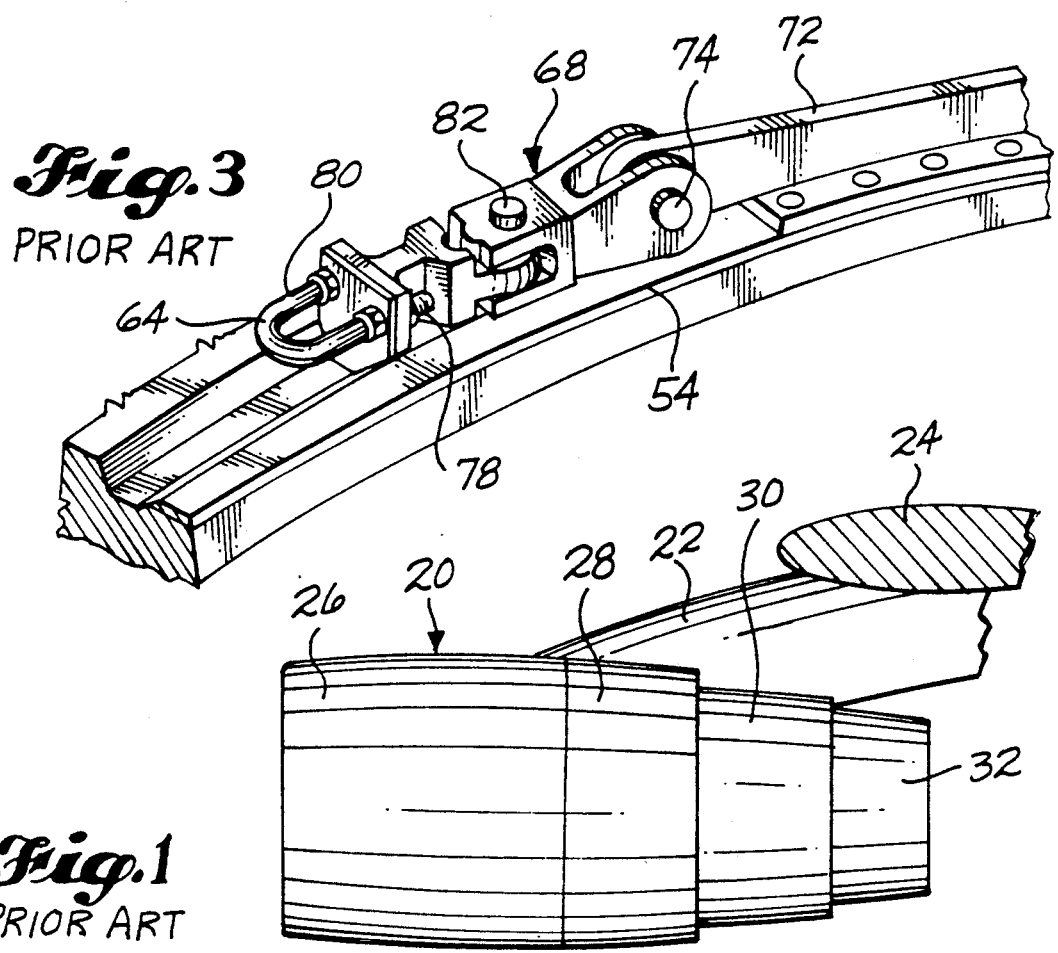

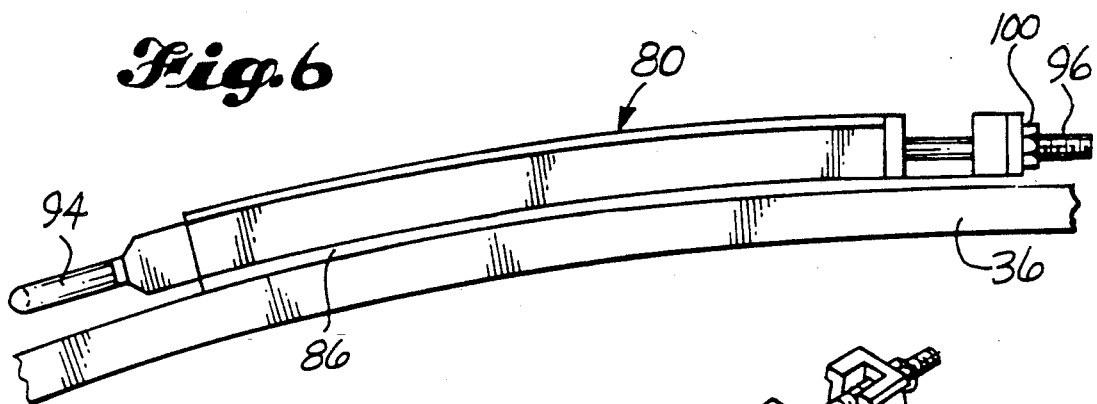
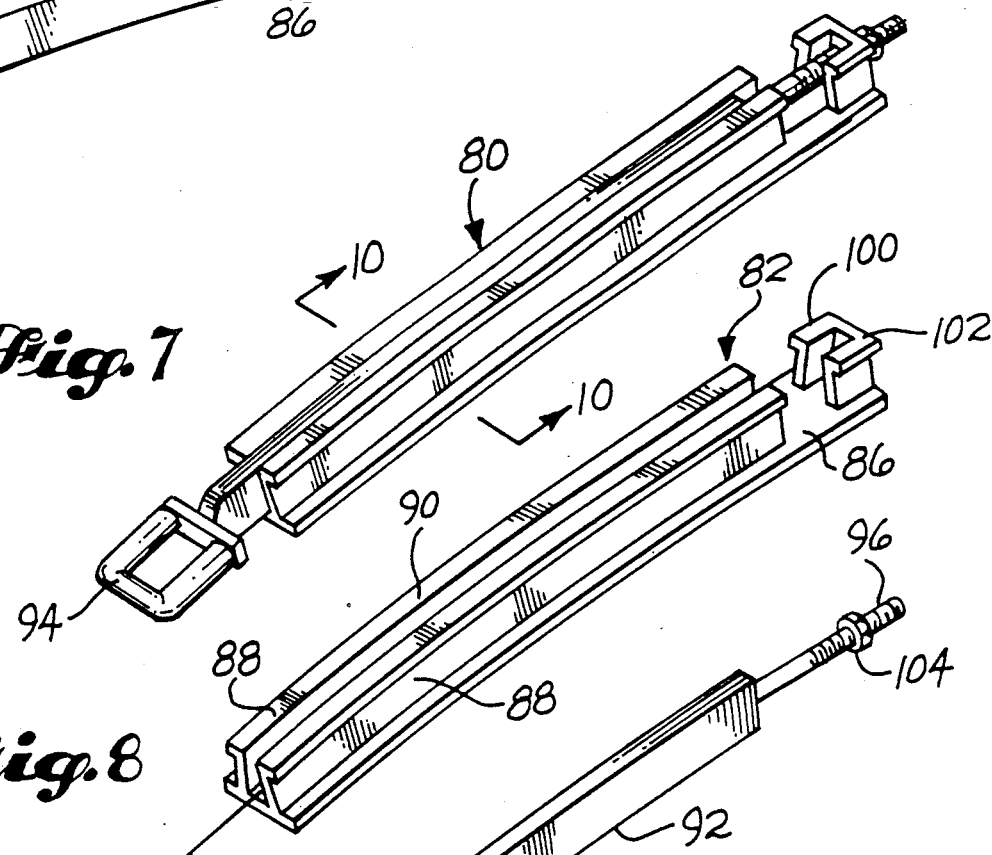
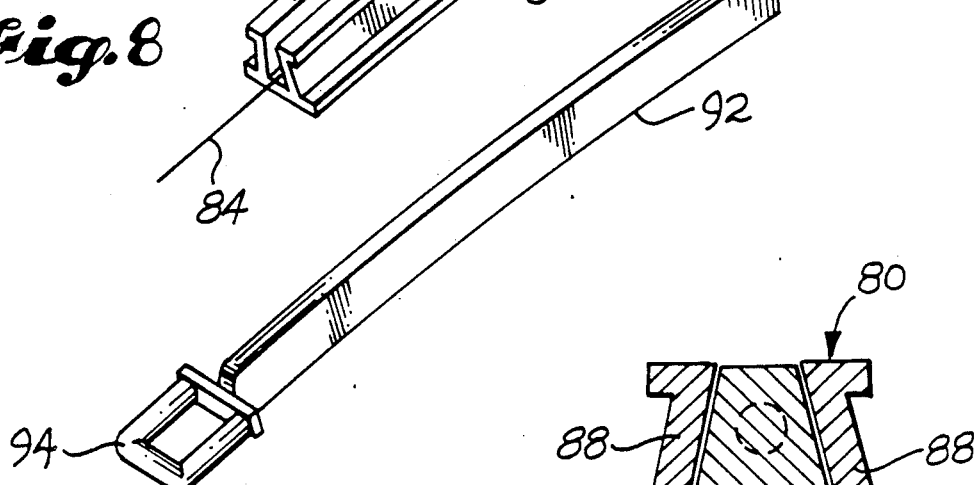
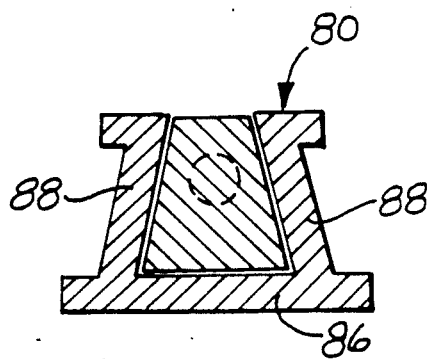

APPARATUS FOR LATCHING TWO PARTS TOGETHER

TECHNICAL FIELD

The present invention pertains to apparatus for latching two parts together, and more particularly to apparatus for latching a thrust reverser cowl to an aircraft engine.

BACKGROUND OF THE INVENTION

Conventionally, in order to attach an aircraft thrust reverser cowl to the engine, a V-band portion of the thrust reverser cowl is inserted in a V-groove located about the engine fan case. The V-band is held in place by a hook assembly which engages a ring which is connected to the engine fan case. The ring is held in the proper position for engagement by the hook assembly by a combination of springs and brackets. It has been found, however, when the springs break or become too weak, the ring is not properly positioned for engagement by the hook.

Conventionally, a number of latching mechanisms have been disclosed. For example, in U.S. Pat. No. 4,320,912 by Grace et al there is disclosed a cowl door latch which includes an eye bolt having an eye portion at one end and a threaded shaft portion at its opposite end for receiving a nut thereon to adjust the position of the eye bolt in a lengthwise direction. In addition, U.S. Pat. No. 4,549,708 by Norris discloses a cowl latch which includes a hook assembly for engaging a clevis at the top of the engine wherein the hook assembly is operated via a cable by a handle located at the bottom of the engine. And furthermore, U.S. Pat. No. 4,557,441 by Aspinall discloses a device for tensioning a V-band that holds a thrust reverser assembly to an engine wherein the device includes a T-bolt that is mounted to one end of the band and which has a threaded shank portion with a nut which is engaged to the other end of the band.

SUMMARY OF THE INVENTION

The present invention pertains to a device which is connected to a first element, such as an aircraft engine, for latching a second element, such as a thrust reverser cowl which has mounted thereon a movable latching hook, to the first element. The latching device includes an elongate base having a lengthwise extending slot and including a first end portion to which there is mounted an upwardly extending keeper. The device also includes an elongate bar mounted inside the slot for slidable movement therein in a lengthwise direction. In the present invention a catch is connected to one end of the bar for receiving the movable hook so as to latch the cowl to the engine. In addition, stop means are mounted to the second end of the bar to engage the keeper so as to prevent lengthwise movement of the bar. The stop means includes adjustment means to permit lengthwise repositioning of the bar within the slot so as to reposition the catch relative to the movable hook.

BRIEF DESCRIPTION OF THE DRAWINGS

The present invention will be discussed in greater detail in the following Detailed Description in conjunction with the attached drawings, in which:

FIG. 1 is side view of a conventional aircraft engine showing outer cowlings and a thrust reverser translating sleeve;

FIG. 2 is a side view of the aircraft engine shown in FIG. 1 in which the outer cowlings and thrust reverser sleeve have been removed;

FIG. 3 is an isometric view of a portion of a conventional latching mechanism for attaching the thrust reverser cowl to the engine;

FIG. 6 is a side view of the latching mechanism of the present invention;

FIG. 7 is an isometric view of the latching mechanism of the present invention;

FIG. 8 is an isometric view of a base portion of the unique latching mechanism; and FIG. 9 is an isometric view of U-ring and sliding bar portions of the unique latching mechanism; and FIG. 10 is sectional end view of the unique latching mechanism taken along line 10—10 of FIG. 7.

DETAILED DESCRIPTION

Figure 4:
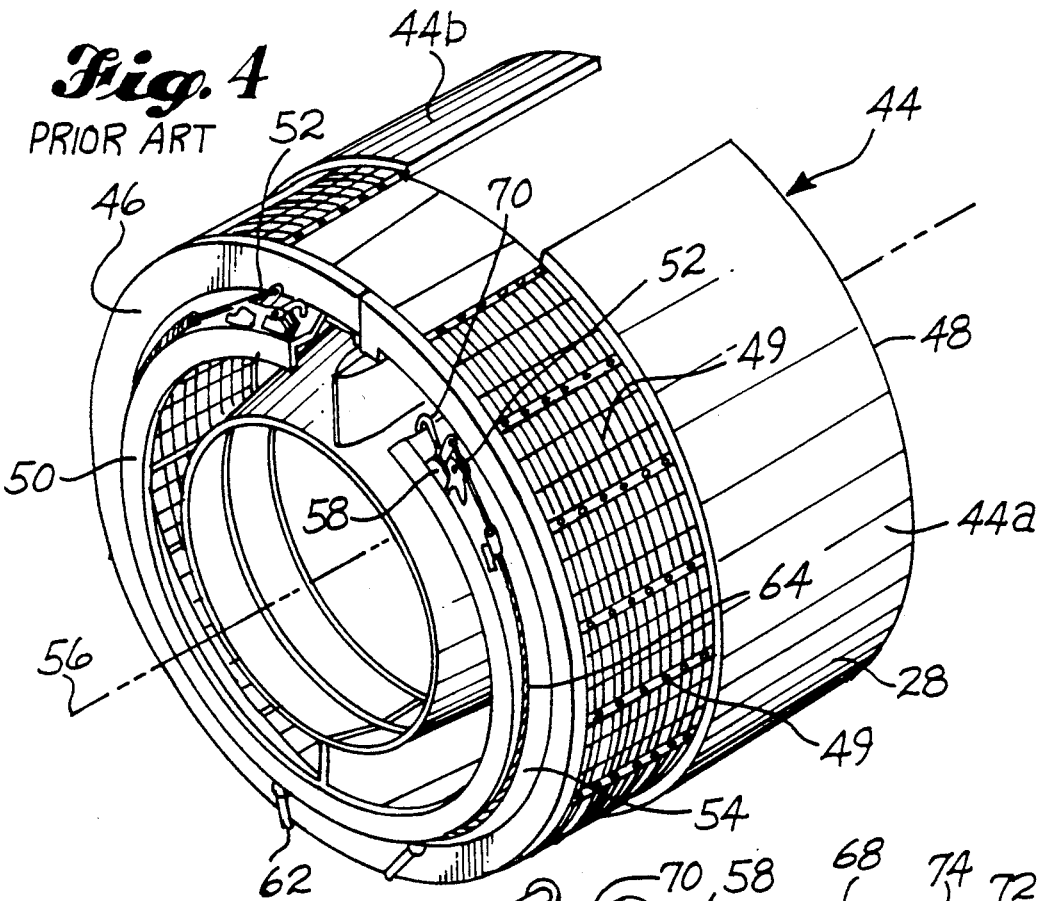
FIG. 4 is an isometric view of the thrust reverser cowl and showing another portion of the conventional latching mechanism for attaching the thrust reverser cowl to the engine.

Before describing the latching mechanism of the present invention, a description of a conventional aircraft engine and a prior art latching mechanism will be provided. Referring first to FIG. 1 there is shown a conventional aircraft nacelle which encloses an aircraft engine (such as engine CF6-80C2 manufactured by CFM International, Inc. of Cincinnati, Ohio) indicated at 20 supported by a strut 22 on a wing 24 (only a portion of which is shown). The nacelle 20 includes an inlet cowl 26, thrust reverser cowl 28, core cowl 30 and nozzle exhaust sleeve 32. Removal of these parts from the engine exposes the engine components shown in FIG. 2. These exposed parts include a fan case indicated at 36 located about the forward part of the engine and engine core indicated at 38. Located circumferentially about the rear end of the fan case 36 is a V-groove 40.

Referring now to FIG. 4 there is shown a conventional thrust reverser cowl indicated at 44 which is made up of two identical clamshells 44a and 44b. The thrust reverser assembly includes a forward end 46 and an aft end 48. The thrust reverser cowl also includes thrust reverser vanes 49 which are uncovered when the translating sleeve portion of the thrust reverser cowl 28 is moved rearward to the open position shown in FIG. 4.

Located at the forward end 46 of the thrust reverser cowl is a lip 50 which extends circumferentially about the cowl. The lip 50 is also referred to as the "V-band". When the thrust reverser cowl is installed about the engine, the lip 50 is inserted in the V-groove 40 (FIG. 2). A pair of identical conventional latching assemblies indicated at 52 (FIG. 4) hold the thrust reverser clamshells in place on the engine More specifically, there is shown in FIG. 4 a collar 54 which extends circumferentially about the forward end of the reverser cowl. The surface of the collar 54 is parallel to the thrust reverser cowl's axial centerline shown by a line identified by the number 56. In order to perform an overcenter latching function, there are mounted near the twelve o'clock position on the collar 54 the latching assemblies 52, each of which includes a hooking mechanism 58 operated by a handle 62 (located near the six o'clock position) by means of a cable 64. In this manner there is one latching assembly for each clamshell 44a, 44b which forms the thrust reverser assembly.

Figure 5A:
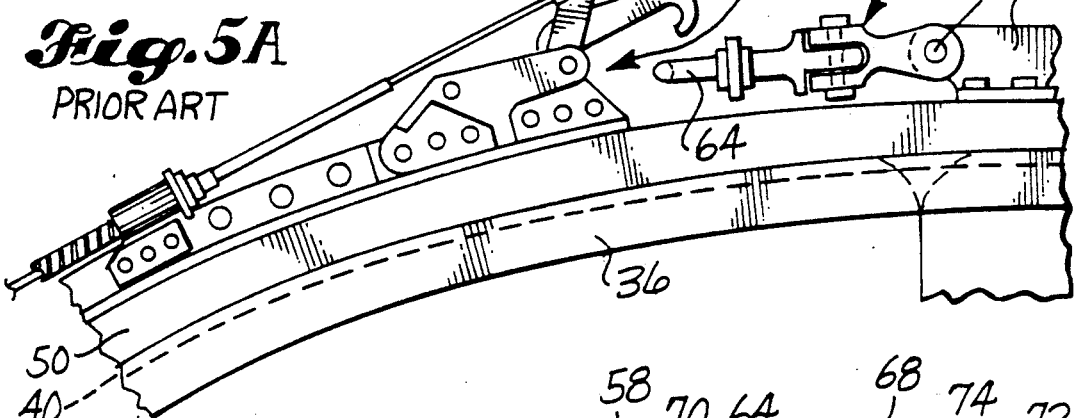
FIG. 5A is a side view showing the conventional latching mechanism in an unlatched position.
Figure 5B:
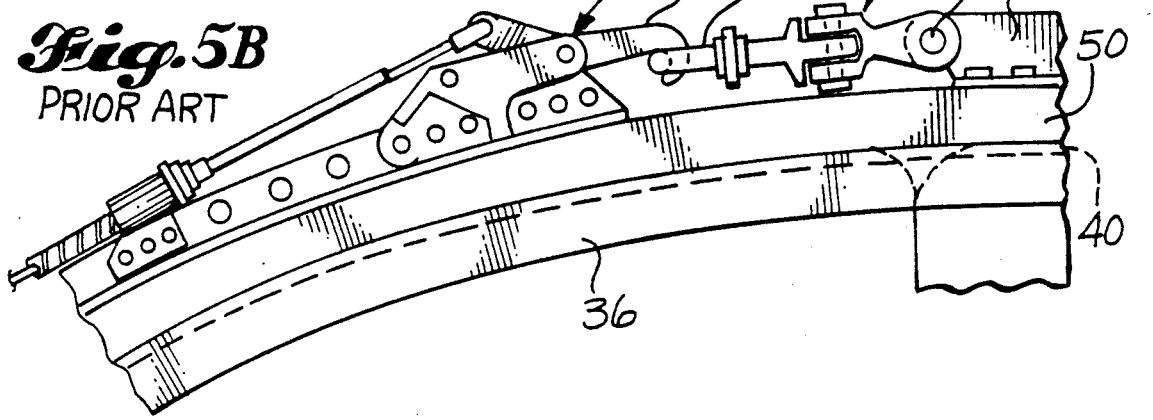
FIG. 5B shows the conventional latching mechanism in a latched position.

The conventional hooking mechanism 58 engages a U-ring catch 64 (FIG. 3) which forms a portion of a conventional receiver assembly indicated at 68. The receiver assembly 68 is bolted to a top rear portion of the fan case 36 as shown in FIG. 2. With regard to the hooking mechanism (FIG. 4), the handle 62, located at the bottom of the thrust reverser cowl, operates to move a draw hook 70 between an unlatched position shown in FIG. 5A to an overcenter latched position shown in FIG. 5B in which the U-ring 64 is engaged by the hook 70. More specifically, when the handle 62 is moved to the raised position shown in FIG. 4, the hook 70 is moved rightward and upward (FIG. 5A) away from the surface of the collar 54 thereby disengaging from the ring 64. On the other hand, when the handle 62 is moved to the lowered position parallel to the surface of the collar, the hook 70 is moved downward inside the U-ring and and leftward into the locked position shown in FIG. 5B. This permits automatic latching at the top of the nacelle from a remote location at the bottom of the nacelle.

Due to the remote location of the receiver assembly 68, it is difficult to determine whether in fact the hook has engaged the U-ring. Therefore, during this latching operation, it is important that the U-ring 64 be in proper alignment to be engaged by the hook 70. Any misalignment of the U-ring 64 may result in failure of the hook to engage the U-ring resulting in inadequate latching of the thrust reverser assembly to the engine.

More specifically, the receiver assembly 68 (FIG. 3) is connected to a mounting lug 72 by means of a pivot pin 74. The mounting lug 72 in turn is bolted to the surface of the collar 54. The elevation of the U-ring 64 above the surface of the collar is controlled by a lock nut (not shown) attached to the pivot pin 74. In addition, the U-ring 64 may be repositioned about the collar 54 by means of a pair of nuts 78 (only one of which is shown) which are threaded to the ends of a pair of shafts 80 which form the U-ring. Furthermore, pivotal movement of the U-ring in a generally axial direction is accomplished by means of a vertical pivot connector 82. In this manner, the position of the U-ring is adjusted conventionally so as to be in a proper position for engagement by the hook.

It is important that the position of the U-ring 64 be adjustable. For example, when the engine is assemblied, there may be small misalignments which prevent the thrust reverser cowl from properly aligning with the engine. This is often referrred to as being "out of clock". Adjustment of the U-ring 64 (FIG. 3) about the collar 54 allows for latching of the thrust reverser assembly to the engine even if the engine is slightly out of clock. It should be appreciated, however, that movement of the U-ring about the collar 54 results in a change in elevation of the U-ring above the surface of the collar. This is due to the curvature of the collar. To compensate for this, the elevation of the U-ring is readjusted about the pivot pin 74.

Having discussed the conventional latching mechanism, attention now will be turned to the latching mechanism of the present invention which is formed by replacing the conventional receiver assembly 68 (FIG. 3) with a receiver assembly indicated at 80 shown in FIGS. 6 through 10. All other components of the conventional latching mechanism described previously remain the same. Referring first to FIG. 8, the receiver assembly 80 includes a base indicated at 82 having a lengthwise axis shown by a line identified by the number 84. The base includes a floor 86 which is bolted to the surface of the fan case 36. The floor 86 has the same curvature as the fan case 36 that the floor is mounted flushly to the surface of the fan case as shown in FIG. 6. Extending upward from the floor 86 are a pair of walls 88 (FIG. 8) which are parallel to the lengthwise axis 84 and which slant inward toward the axis 84 thereby forming a slot 90 which has a dovetail configuration.

Located within the slot 90 is a receiver bar 92 (FIG. 9) which has attached to its left end a U-ring 94 and to its right end a threaded shaft 96 which is parallel to the axis 84. The receiver bar 92 has a shape which is complementary to the shape of the slot 90 so as to permit slidable axial movement of the bar 92 within the slot 90 but which retains the slidable bar 92 within the slot. In this manner the position of the U-ring 94 may be adjusted to compensate for any out of clock condition of the engine.

In order to adjust the position of the receiver bar, there is mounted to the right end of the floor 86 a U-shaped keeper (FIG. 8) which is formed by a pair of parallel side walls 100 and a back wall 102 which extend upward from the floor. The shaft 96 of the receiver bar extends through a hole in the back wall 102 and a retaining nut 104 is threaded to the shaft so that the nut 104 engages the right side of the back wall 102. In this manner extension of the receiving bar 92 and U-ring 94 therewith in the leftward direction is controlled by the position of the nut 104 on the shaft. Furthermore, since the curvature of the receiving bar matches the curvature of the fan case, no adjustment of the elevation of the U-ring is necessary when the U-ring is repositioned along the axis 841 More specifically, the curvature of the base 82 and bar 92 is such that as bar 92 is repositioned in a lengthwise direction within the slot 90, the position of the U-ring 94 remains at a constant radius from the axial centerline 56 (FIG. 4) of the thrust reverser cowl.

What is claimed is:

1. Apparatus which are connected to a first element for latching a second element, which has mounted thereon a movable hook, to the first element, the apparatus comprising:
  a. an elongate base mounted to a surface of the first element and having a lengthwise extending slot and including a first end portion and a second end portion to which there is mounted an upwardly extending keeper, the elongate base having a curved configuration which corresponds to a curved configuration of the first element;
  b. an elongate bar mounted inside the slot for slidable movement therein a lengthwise direction, the bar including (i) a first end and a second end, (ii) a catch which is connected to the first end of the bar for receiving the movable hook so as to latch the second element to the first element, (iii) a curved configuration which corresponds to the curved configuration of the elongate base in a manner that during repositioning of the elongate bar within the slot in the lengthwise direction, a distance between the catch and an axial centerline of the first element remains constant, and (iv) a threaded shaft, at the second end of the bar, which extends through an opening in the keeper; and c. stop means which are mounted to the second end of the bar and which engage the keeper so as to prevent movement of the bar in a direction toward the hook, the stop means including adjustment means to permit lengthwise repositioning of the bar within the slot so as to reposition the catch relative to the hook, the adjustment means including a nut (i) which is threaded on the shaft so as to engage the keeper in a manner to prevent repositioning of the bar in the lengthwise direction toward the hook and (ii) which is adjustable so as to adjust a location of the catch relative to the hook.

2. The apparatus as set forth in claim 1 wherein the catch is a U-ring.

3. The apparatus as set forth in claim 1 wherein:
a. the first element is an airplane engine fan case; and
b. the second element is an airplane engine thrust reverser cowl.

4. Apparatus which are connected to an aircraft engine fan case for latching a thrust reverser cowl, which has mounted thereon a movable hook, to the aircraft engine, the apparatus comprising:
a. an elongate base, having a curved configuration which corresponds to a curved configuration of the fan case, mounted to a surface of the fan case and having a lengthwise extending slot and including a first end portion and a second end portion to which there is mounted an upwardly extending keeper;
b. an elongate bar mounted inside the slot for slidable movement therein in a lengthwise direction, the bar having (i) a first end and a second end, (ii) a catch which is connected to the first end of the bar for receiving the movable hook so as to latch the thrust reverser cowl to the fan case and (iii) a curved configuration which corresponds to the curved configuration of the elongate base in a manner that during repositioning of the elongate bar within the slot in the lengthwise direction a distance between the catch and an axial centerline of the fan case remains constant; and
c. stop means which are mounted to the second end of the bar and which engage the keeper so as to prevent movement of the bar in a direction toward the hook, the stop means including adjustment means to permit lengthwise repositioning of the bar within the slot so as to reposition the catch relative to the hook.

5. The apparatus as set forth in claim 4 wherein:
a. the second end of the bar includes a threaded shaft which extends through an opening in the keeper; and
b. the stop means includes a nut (i) which is threaded on the shaft so as to engage the keeper in a manner to prevent movement of the bar in the lengthwise direction toward the hook and (ii) which is adjustable so as to adjust a location of the catch relative to the hook.

6. The apparatus as set forth in claim 5 wherein the catch is a U-ring.

7. In an aircraft engine comprising:
a. a first element of the aircraft engine having a curved configuration and an axial centerline;
b. a second element of the aircraft engine having a movable hook;
c. an elongate base which is mounted to a surface of the first element and which has a lengthwise extending slot, the base further including a first end portion and a second end portion to which there is mounted a keeper, the elongate base additionally having a curved configuration which corresponds to the curved configuration of the first element;
d. an elongate bar mounted inside the slot for slidable movement therein in a lengthwise direction, the bar including a first end and a second end, the elongate bar having a curved configuration which corresponds to the curved configuration of the elongate base in a manner that during repositioning of the elongate bar within the slot in the lengthwise direction a distance between the catch and the axial centerline remains constant;
e. a catch which is connected to the first end of the bar for receiving the movable hook so as to latch the second element to the first element; and
f. stop means which are mounted to the second end of the bar and which engage the keeper so as to prevent movement of the bar in a direction toward the hook, the stop means including adjustment means to permit lengthwise repositioning of the bar within the slot so as to reposition the catch relative to the hook.

8. In an aircraft engine comprising:
a. an aircraft engine fan case having a curved configuration and an axial centerline;
b. a thrust reverser cowl which has mounted thereon a movable hook;
c. an elongate base, having a curved configuration which corresponds to the curved configuration of the fan case, mounted to a surface of the fan case and having a lengthwise extending slot nd including a first end portion and a second end portion to which there is mounted a keeper;
d. an elongate bar mounted inside the slot for slidable movement therein in a lengthwise direction, the bar including a first end and a second end and having a curved configuration which corresponds to the curved configuration of the elongate base in a manner that during repositioning of the elongate bar within the slot in the lengthwise direction a distance between the catch and the axial centerline remains constant;
e. a catch which is connected to the first end of the bar for receiving the movable hook so as to latch the thrust reverser cowl to the fan case; and
f. stop means which are mounted to the second end of the bar and which engage the keeper so as to prevent movement of the bar in a direction toward the hook, the stop means including adjustment means to permit lengthwise repositioning of the bar within the slot so as to reposition the catch relative to the hook.

* * * * *